United States Patent [19]

Pudark et al.

[11] 4,309,102

[45] Jan. 5, 1982

[54] ORIGINAL DOCUMENT HANDLER

[75] Inventors: Arthur A. Pudark, Downers Grove; George P. Niesen, Mt. Prospect; Frederick O. Bach, Elmhurst; Mahendra B. Shukla, Glenview, all of Ill.

[73] Assignee: A. B. Dick Company, Chicago, Ill.

[21] Appl. No.: 87,212

[22] Filed: Oct. 22, 1979

[51] Int. Cl.$^3$ .......................................... G03G 15/00
[52] U.S. Cl. .............................. 355/14 SH; 355/69; 355/75; 355/104
[58] Field of Search ............... 355/3 R, 3 SH, 14 SH, 355/75, 76, 104, 113, 117, 69

[56] References Cited

U.S. PATENT DOCUMENTS

| | | | |
|---|---|---|---|
| 3,152,528 | 10/1964 | Pendry | 355/75 X |
| 3,401,617 | 9/1968 | Rait | 355/117 X |
| 3,591,281 | 7/1971 | Kruhlinski et al. | 355/104 X |
| 3,623,806 | 11/1971 | Short | 355/75 X |
| 3,674,363 | 7/1972 | Baller et al. | 355/3 SH X |
| 4,030,826 | 6/1977 | Sangster | 355/117 X |

FOREIGN PATENT DOCUMENTS

| | | | |
|---|---|---|---|
| 1077533 | 3/1960 | Fed. Rep. of Germany | 355/104 |
| 782671 | 9/1957 | United Kingdom | 355/104 |

Primary Examiner—Fred L. Braun
Attorney, Agent, or Firm—Peter S. Lucyshyn

[57] ABSTRACT

A document carrier includes a transparent cover which is selectively wrapable about the periphery of the carrier for releasably sandwiching the document between the carrier periphery and the cover, the carrier being rotatable about an axis for advancing the document thereon past a stationary viewing station. A bypass document handler is also provided for receiving and advancing a document past the viewing station intermediately of the carrier and the station, wherein a microcomputer is responsive to rotation of the carrier for rendering the copying apparatus operable in synchronized relationship with the rotation of the carrier and/or the advancement of a document through the bypass document handler.

8 Claims, 17 Drawing Figures

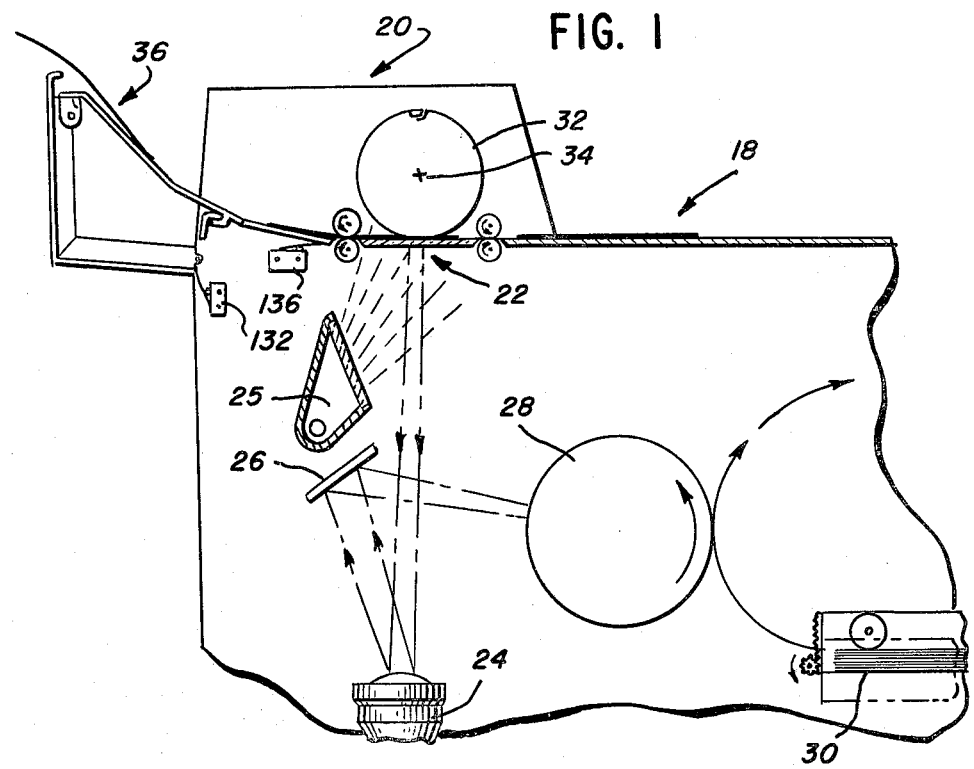
FIG. 1
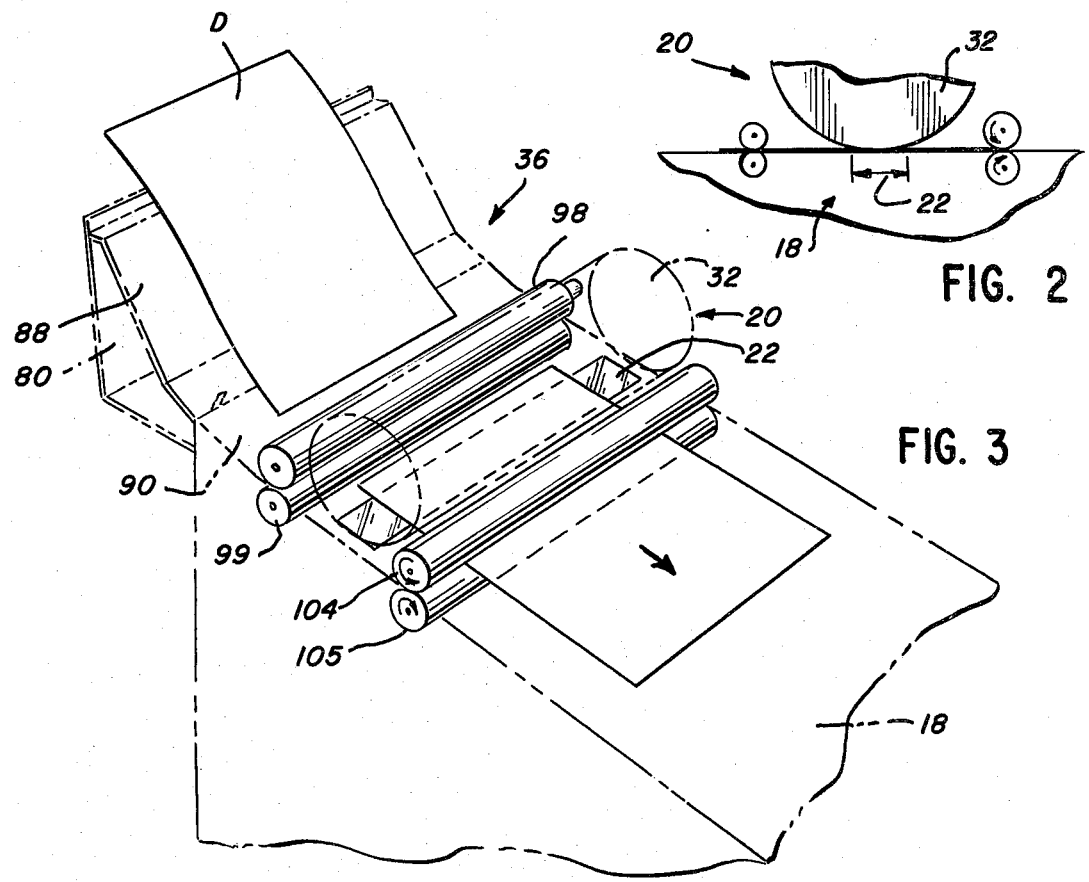
FIG. 2
FIG. 3

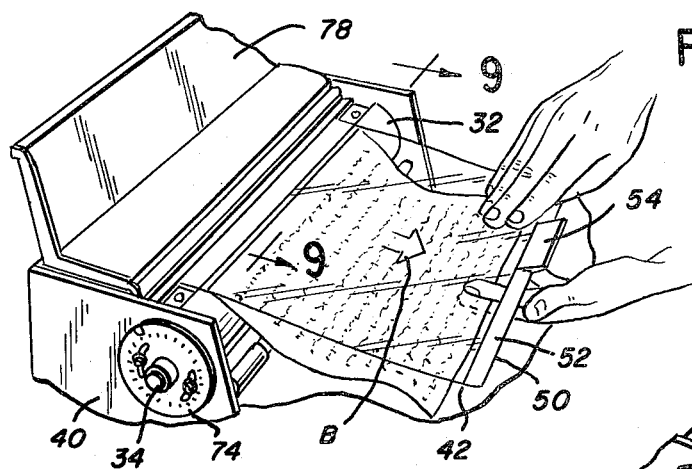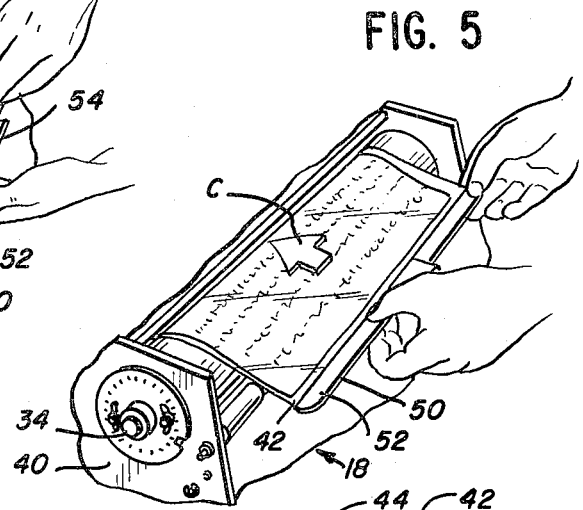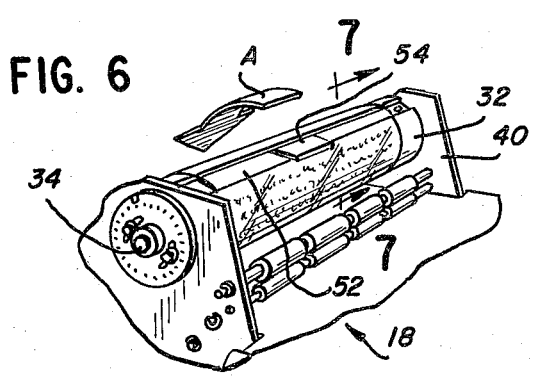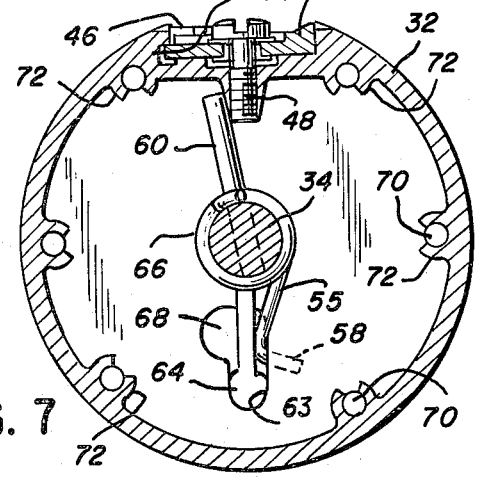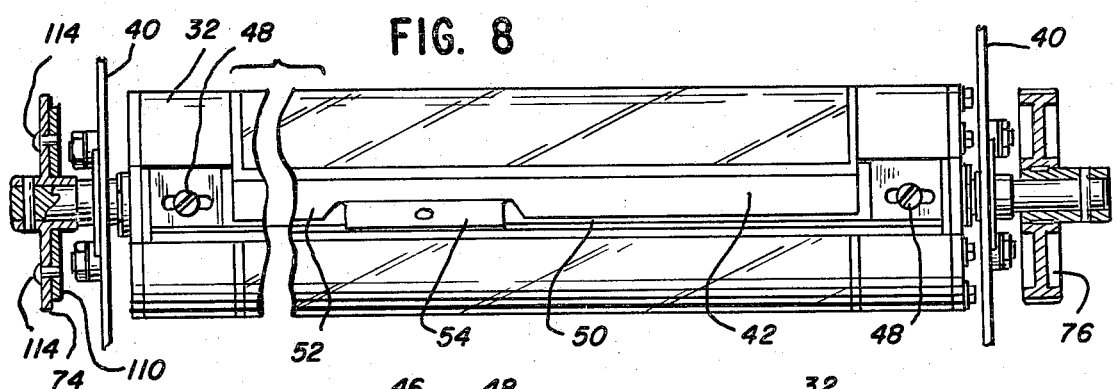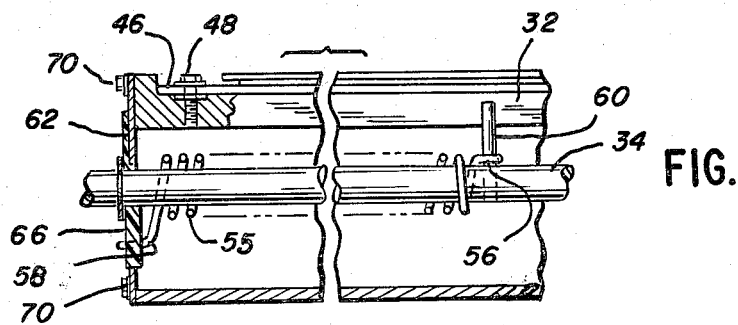

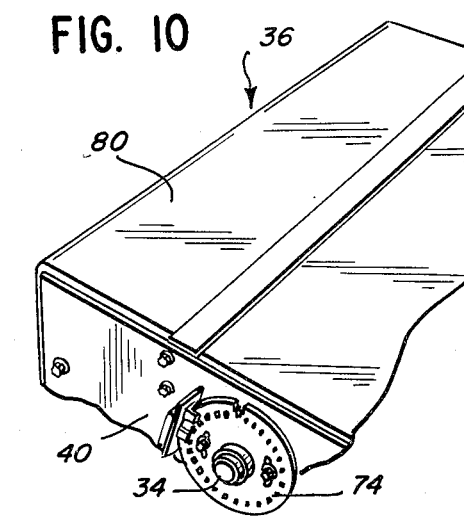
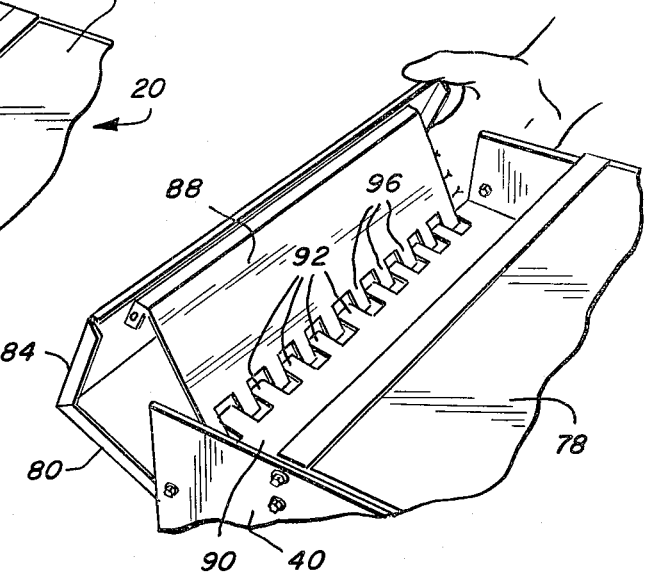
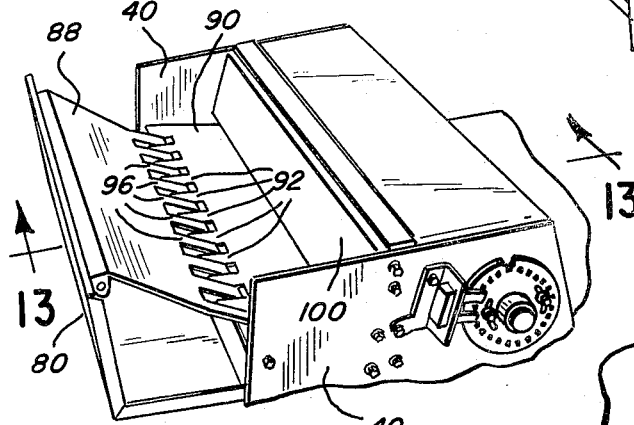
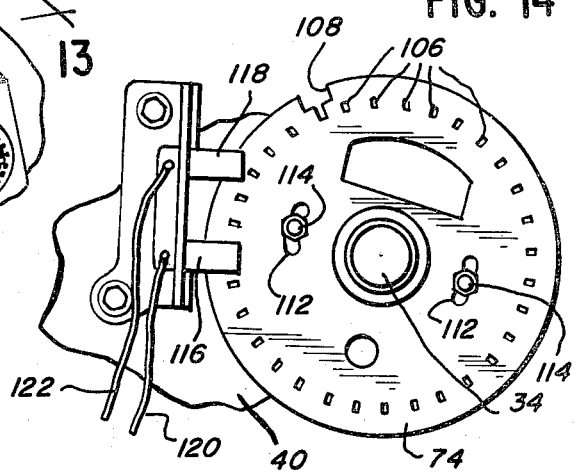
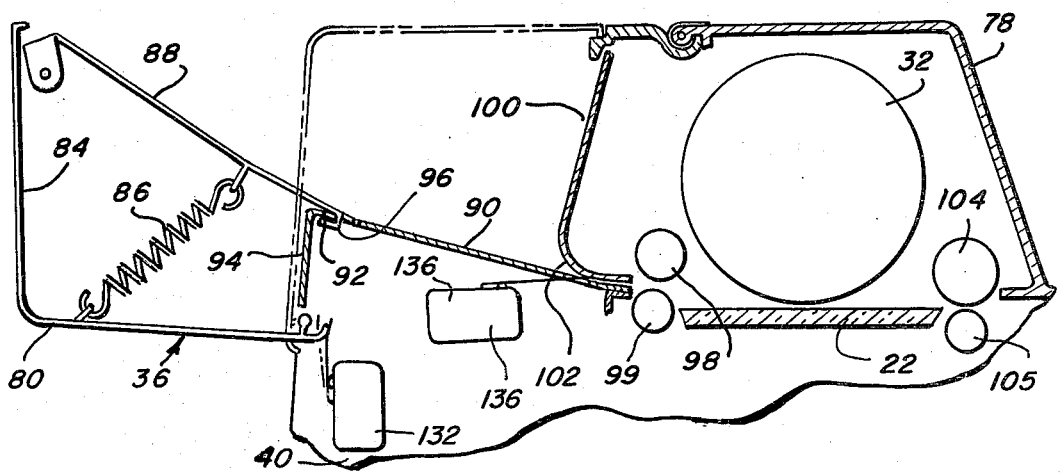

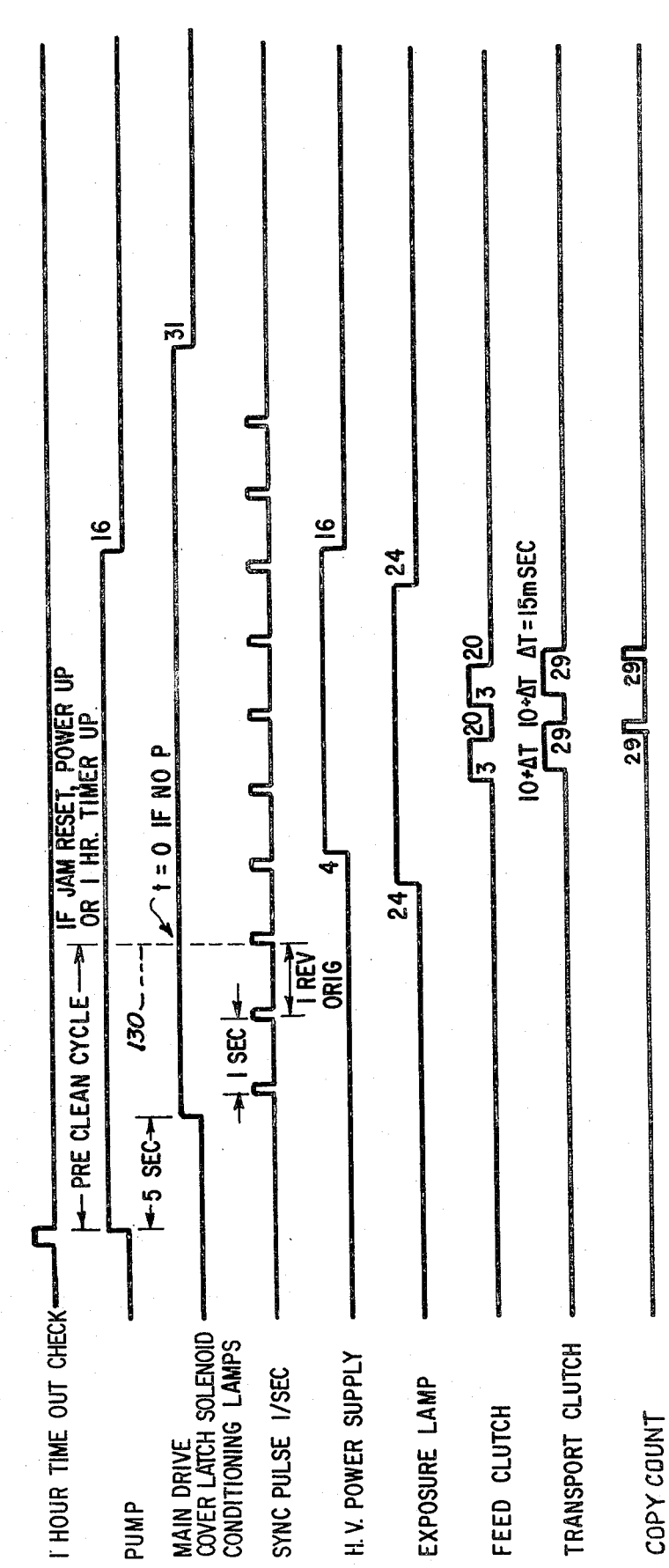

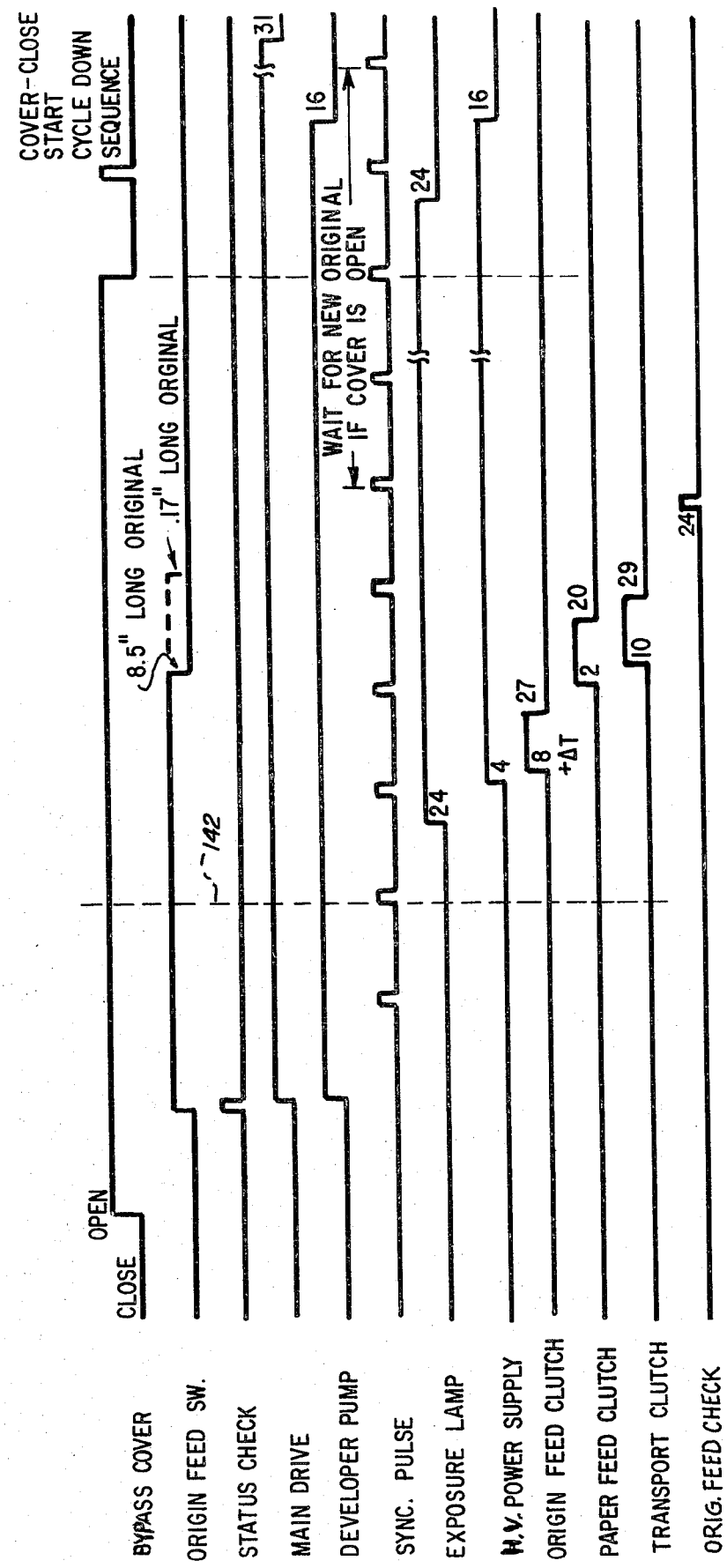
FIG. 17 BYPASS MODE

ORIGINAL DOCUMENT HANDLER

BACKGROUND OF THE INVENTION

1. Field of the Invention

This invention relates to means for advancing an original document past the viewing station of a copying machine or the like.

2. Description of the Prior Art

In processing machines such as xerographic copiers and the like, it is generally necessary to scan an original document and project its image into processing apparatus for making a duplicate copy thereof. In the past, this generally has been accomplished by either holding the document stationary while moving the scanning apparatus relative thereto or by placing the document on a movable platen for advancing it past a stationary scanning or viewing window. In either case, the moving member has to be returned to the initial starting point at the end of each scanning cycle. The return stroke is an unproductive motion characteristic of the prior art arrangements which reduces the overall efficiency of the machine operation. The time lost during the return stroke is particularly significant when multiple copies are made of a single document, the return stroke sometimes taking as much as twenty-five percent of the copy cycle operation time.

It is known to provide a cylinder for holding a single document, end-to-end, for rotating relative to a scanning apparatus, as shown for example in West German unexamined patent specification Nos. OS 25 55 037, filed Dec. 6, 1975 and laid open June 8, 1977. As there shown, a document is held against the periphery of a cylinder by a single clamp which engages the opposite ends of the document and holds them securely in a recessed channel provided in the cylinder, thus partially blocking the end edges of the original document while also potentially causing damage to these edges. A cylindrical document holder for supporting a transparent master is disclosed in West German unexamined patent specification Nos. OS 26 16 137, filed Apr. 13, 1976 and laid open Oct. 20, 1977. As there shown, the light source for illuminating the transparent master is located within the cylinder and projects light through the document during the scanning operation. The means for holding a transparency on the cylinder is not disclosed.

While the above holders do not necessarily require a return stroke during scanning operations, neither of these devices provides for a rotatable document carrier which may be easily and quickly loaded and unloaded for use with a standard office copier or the like.

SUMMARY OF THE INVENTION

The present invention provides an original document handler which is easily loaded and unloaded, for presenting the entire document to a scanning or viewing apparatus while protecting the document from external elements during processing. The document handler is adapted for rapidly recycling an original document for performing a plurality of repeated operations relative thereto without requiring an unproductive return stroke to return the original document to a starting position at the end of a cycle. The apparatus of the present invention is particularly well suited for carrying original documents through a copying machine since it eliminates the heretofore required return stroke of either the machine platen or the lens apparatus for receiving the projected image, making the apparatus less complex to design and more efficient to operate.

In accordance with the present invention the original document handler includes a rotatable carrier mounted adjacent the viewing station of a document processing machine, for example, a copier/duplicator and a document holder associated with the carrier for releasably securing a document against the periphery of the carrier, whereby the document is advanced past the viewing station by rotation of the carrier. The document holder may comprise a substantially transparent cover selectively wrappable about the periphery of the carrier for sandwiching the document between the carrier and the cover. A biased winder may be provided for automatically wrapping the cover about the carrier to facilitate the loading of original documents therein.

As another feature of the invention, a bypass means is provided for guiding an original document past the machine viewing window when only a single copy of a document is desired or when a copy of an odd-sized document is required and it is not convenient to use the rotatable carrier. The bypass means are operative to advance the document past the viewing window intermediately of the window and the carrier in synchronized relationship with rotation of the rotatable carrier, whereby the same processing cycle may be used.

In order to assure proper sequencing of the processing cycle, the machine control system is rendered operative in response to a clock which is driven by rotation of the carrier. To ensure proper cycling, a synchronizing pulse is generated for each revolution of the carrier. This clock controls all of the machine functions, including the operation of the bypass mode.

These and other features and advantages of the invention will be readily apparent from the attached drawings and from the detailed description which follows.

BRIEF DESCRIPTION OF THE DRAWINGS

FIG. 1 is a diagrammatic illustration of a copying machine incorporating the features of the present invention.

FIG. 2 is a partial view of the apparatus shown in FIG. 1, enlarged for clarity of detail and understanding.

FIG. 3 is a diagrammatic perspective view of the document path defined by an apparatus incorporating the features of the present invention.

FIG. 4 is a partial perspective view of a cylindrical document carrier in accordance with the teachings of the present invention, with a flexible transparent cover shown extended for loading a document therein.

FIG. 5 is a view similar to FIG. 4 and illustrates the retraction and wrapping of the transparent cover around the periphery of the cylinder.

FIG. 6 is a view similar to FIG. 4, showing a document loaded in the cylindrical carrier.

FIG. 7 is a section view taken at line 7—7 of FIG. 6.

FIG. 8 is an elevation view, partly in section, of the cylindrical document carrier shown in FIG. 4.

FIG. 9 is a section view taken at line 9—9 of FIG. 4.

FIG. 10 is a partial perspective view of a bypass document advancing means in accordance with the teachings of the present invention, with the lower chute assembly retracted and the cover closed.

FIG. 11 is a view similar to FIG. 10 and illustrates movement of the lower chute assembly from the retracted, closed position to the extended, open position.

FIG. 12 is a perspective view of the apparatus of FIG. 10 with the lower chute assembly fully open and extended for receiving a document.

FIG. 13 is a section view taken at line 13—13 of FIG. 12.

FIG. 14 is an elevation view of the timing disc of the present invention, enlarged for clarity of detail and understanding.

FIG. 16 is a timing diagram for the normal mode of operation.

FIG. 17 is a timing diagram for the bypass mode of operation.

DESCRIPTION OF THE PREFERRED EMBODIMENT

Figure 15:
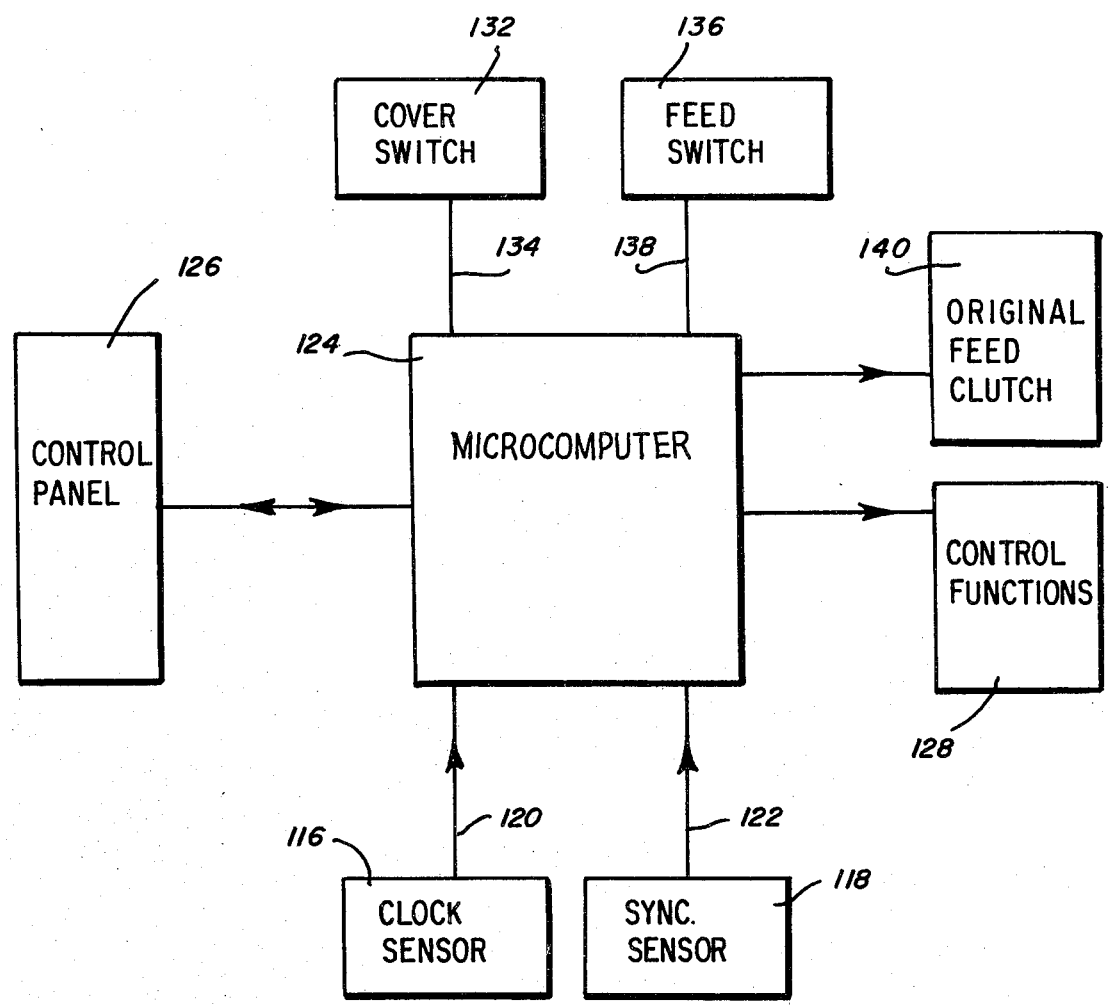
FIG. 15 is a flow diagram of the circuitry for controlling the operation of the apparatus of the present invention.

While the original document handler here shown and described is particularly well suited for advancing documents past the viewing station of a xerographic copier or the like, it will be readily understood that the apparatus is also useful in many other systems requiring document handling mechanisms. As shown in FIGS. 1-3, a typical copier machine 18, includes a document handler 20 mounted adjacent the platen or viewing station 22 of the machine. Generally, the viewing station 22 comprises a window or opening through which the image on an original document D is viewed by a mechanism such as lens 24 as the document is advanced past the station. Lamp 25 illuminates the image on the original document as it passes the window 22. As shown, and by way of example, the lens 24 directs the projected image to a mirror 26 which, in turn, reflects the image onto a photosensitive surface such a drum 28. The movement of the document past the window 22 is coordinated with rotation of the drum 28 so that a precise image of the original is formed on the drum. Copy paper carried on the platform 30 is advanced into contact with the drum 28 as it rotates, for transferring the image from the drum onto the paper in the well-known manner.

In accordance with the present invention, the document handler includes a carrier having a transparent document holder which is selectively wrappable about the carrier for releasably holding an original document against the carrier periphery so that, as the carrier rotates about an axis, the document is advanced past the stationary viewing window. Since a plurality of passes of the original document by the viewing window may be made without a return stroke of either the carrier or the viewing station, the rotatable carrier is particularly well suited for making multiple copies of a single document, greatly enhancing the speed and efficiency of the copying operation. Since the copying apparatus is productive during a greater portion of its cycle, the elimination of the return stroke is particularly significant when the original handler is used in a copying machine incorporating a wet-toner developing process. In such a case, the amount of effluent released into the atmosphere during processing is a direct result of cycle on time and by utilizing a more productive processing cycle, the amount of effluent per copy produced is reduced.

Referring now to the particular embodiment illustrated in the drawings, there is shown in FIGS. 4-9 a carrier 32 carried by an axially extending shaft 34 which is mounted for rotation in the frame 40 of the copy machine. While the carrier shown and described is a hollow cylinder, it will be readily understood that the carrier can take on other forms which are capable of supporting a document for rotation about an axis. A flexible, transparent document holder or cover is adapted to be selectively wrapped about the carrier 32 and, as shown in FIG. 4, may be unwrapped from the carrier for placing an original document between the carrier and the cover. As shown in FIG. 5, the cover is then wrapped around carrier 32 for sandwiching the document between the cover and carrier against the periphery of the carrier, after which the carrier may be rotated in the direction of arrow A for advancing the document past the viewing window of the machine.

The flexible, transparent document holder or cover 42 has one end secured to the carrier 32, accomplished in the present instance by placing the end into an axially extending channel 44 in the periphery of the carrier and clamping it therein by means such as, by way of example, the elongated plate 46 secured to the carrier by holddown screws 48, or the like. The plate is made from, or includes, a magnetic material, and the outer or free end 50 of the cover includes a magnetic strip 52 which is magnetically attracted to and held down by plate 46 when the cover is wrapped around the carrier 32. An integral flap 54 is provided on the cover 42 for providing easy access to the cover for lifting and freeing the strip 52 from the plate 46 during loading and unloading of documents.

As particularly shown in FIGS. 7 and 9, the carrier includes a biased winder defined by a torsion spring 55 encircling the shaft 34 and having opposite ends 56, 58 secured to post 60 projecting radially outward from the shaft 34 and to end plate 62 of the carrier, respectively. The torsion spring 55 is biased to urge rotation of the carrier 34 in the direction of arrow C about the shaft 34. The post 60 is positioned to intercept the projecting portion of the cylinder which is adapted for receiving the holddown screws 48, defining a positive stop to limit the rotational movement between the carrier 32 and the shaft 34.

In the embodiment shown, and by way of example, each of the end plates of carrier 32 includes a substantially key-hole shaped opening 63 adapted for receiving a complementary, lowfriction bearing member 64 which includes an enlarged ring-shaped end 66 adapted for receiving the shaft 34, ensuring smooth and relatively friction free rotation of the carrier 32 relative to the shaft 34. Slot 68 is provided in end plate 62 for receiving the end 58 of the spring 55. Each end plate may be secured to the carrier by means such as screws 70 which are received by threaded sockets 72 provided inboard of the periphery of the carrier.

Typically, the flap 54 is grasped and the cover 42 is pulled radially outward from the carrier 32 in the direction of arrow B, as shown in FIG. 4, tightening the spring 55. After a document has been placed between the cover and the carrier, the torsion spring 55 acts to rotate the carrier relative to shaft 32 in the direction of arrow C, wrapping the cover and the document about the periphery of the carrier, whereby the document is loaded onto the carrier 32 for advancement past the viewing station 22 of the copy machine when the carrier is rotated in the direction of arrow A by activating the drive means 76 to turn shaft 34. As will be described in detail herein, synchronized rotation of the drum 28, the carrier 32 and the corresponding operation of a copying cycle is controlled by means including the timing disc 74 mounted for rotation with shaft 34.

In order to protect the operator during processing and to minimize the escape of light from lamp 25, it is desirable to provide a hinged cover 78 attached to the frame 40 of the machine. The cover is adapted to be opened for loading and unloading documents from the carrier 32 (FIG. 4) and to be closed during operation (FIG. 10).

In accordance with another aspect of the present invention, a bypass document handler is included, whereby a single pass of an original document may be made without requiring the loading of the document into the carrier. Control means responsive to rotation of the carrier render the copying apparatus operable in synchronized relationship with the rotation of the carrier and/or the advancement of a document by the bypass document handler. The bypass handler is particularly useful when an odd-sized document is to be copied or when a high volume, multiple copy run of a single document has to be momentarily interrupted for making a single copy.

As particularly shown in FIGS. 3 and 10-13, the bypass document handler 36 includes means for receiving and guiding a document past the viewing station 22 of the copying machine intermediately of the station and the carrier 32. In the preferred embodiment, a hinged cover 80 is movable between a fully closed position (FIG. 10) and a fully opened position (FIGS. 12 and 13) for providing access to means for receiving and guiding an original document past the window 22. As shown, the cover is L-shaped and is hingedly connected to frame 40 at 82, whereby an upstanding vertical section 84 is provided when the cover is opened.

The document guide means are defined by a lower chute assembly having an upper slide 88 and a lower slide 90. The upper slide 88 is mounted for movement with the cover 80 and is secured to and projecting angularly downward from the upstanding section 84 when the cover 80 is disposed in the fully opened position (FIGS. 12 and 13). The lower slide 90 is mounted in the frame 40 of the machine and is inclined to receive a document placed on upper slide 88 and guide it toward the viewing window 22 of the machine. The outer, uppermost end edge of lower slide 90 terminates in a plurality of elongated, spaced tabs 92 each having a depending portion 94, as best seen in FIG. 13. The lower end edge of the upper slide 88 also terminates in a plurality of tabs 96 which are spaced to be complementary with and intermesh with tabs 92 of the lower slide 90. Springs 86 or the like have opposite ends secured to the upper slide 88 and cover 80 for continuously urging the tabs 96 into engagement with the complementary tabs 92 of the lower slide. This permits folding of the upper slide toward the lower slide for closing the cover 80, see FIG. 11, while defining a relatively smooth surface for guiding a document when the cover is opened.

Located at the inner end edge of lower slide 90 are means for receiving and feeding a document past the viewing station such as, by way of example, a pair of forward feed rollers 98, 99 mounted for rotation in the frame 40 of the machine. An upper chute assembly 100 is also mounted in the frame 40 and includes a lower end edge 102 which is curved toward rollers 98, 99 for directing the leading edge of a document on slide 90 into engagement with the feed rollers 98, 99. As will be explained in detail herein, means are provided for driving the forward feed rollers 98, 99 to advance the document past the viewing station intermediately of the cylindrical carrier 32 and the window 22, as diagrammatically shown in FIG. 3. A pair of rearward feed rollers 104, 105 are also mounted for rotation in frame 40, and are driven in correspondence with rollers 98, 99. The rearward feed rollers engage the leading edge of the document and eject the document from the bypass means after it has passed window 22.

The drive means (not shown) for driving the pairs of feed rollers 98, 99 and 104, 105 are operated in synchronized relationship with the rotation of the carrier 32 and the drum 28 and with the operation of an associated copying cycle, as will now be explained in detail. As stated, the timing disc 74 is mounted for rotation with the shaft 34 and hence, the carrier 32. Referring specifically to FIG. 14, the disc includes a plurality of clocking or timing pulse generators such as, by way of example, the radially spaced slots or apertures 106. In the preferred embodiment, there are thirty-two slots disposed in equally spaced relationship on disc 74 for generating thirty-two equally spaced clocking pulses during each rotation of the carrier 32. There is also provided an enlarged slot or aperture 108 in communication with one of the timing slots 106. The aperture 108 is used to generate one pulse during each rotation of carrier 32 and therefore, defines a synchronizing pulse generator for indicating a specific point in each rotation of the carrier 32 and, as will be described, a specific point in each cycle. Minor adjustment of the position of the disc relative to the shaft 34 is provided to ensure accurate alignment of the disc with the carrier 32. In the present instance, a plate 110 is mounted on shaft 34 for receiving the timing disc 74 (FIG. 8), the timing disc including a pair of elongated adjusting slots 112, each adapted for receiving holddown screws 114 which are secured in plate 110.

Sensing means such as, by way of example, a pair of electro-optical sensors 116, 118 are mounted on frame 40 in communication with the slots 106, 108, respectively, of the disc. The sensor 116 is adapted for generating an electrical signal or pulse on conductor 120 each time it detects a timing slot 106 during rotation of the disc. The sensor 118 is likewise adapted for generating a pulse on conductor 122 each time it detects the synchronizing slot 108 during rotation of the disc. Thus, in the embodiment shown, thirty-two clocking pulses will be generated on conductor 120 and one synchronizing pulse will be generated on conductor 122 for each rotation of disc 74. As shown in FIG. 15, the sensors 116 and 118 are electrically connected to a microcomputer 124, which is the heart of the control system for the machine. Also electrically connected to the microcomputer are an input/output device such as a control panel 126 generally conveniently located on the frame 40 of the machine and the machine function controls 128. The microcomputer is programmed to drive the function controls 128 in response to signals received from the control panel 126 and the sensors 116 and 118, as will now be explained.

FIG. 16 is a timing diagram representing a typical cycle for generating a plurality of copies, in this case two copies, from a single original document during the normal mode of operation when an original document is loaded on the cylindrical carrier 32. For purposes of illustration, it is assumed that the carrier is rotating at one revolution per second and therefore, that there are thirty-two clocking pulses and one synchronizing pulse generated every second of operation. It is also assumed that the copying machine includes a wet-toner developing process and, therefore, that a toner pump (not shown) is present in the machine. Generally, in other types of developing systems, the toner pump would be replaced with other toner control devices. Assuming the machine has been de-energized prior to the beginning of the exemplary cycle, the operator will energize the machine in typical fashion by pushing an appropriate button on the control panel 126 and will program the machine to make two copies by entering this information into the microprocessor. At this point, a malfunction check system is energized and after the check is successfully completed, the machine pump is energized. After the pump is operating at full pressure, the main drive is activated and the conditioning lamps are energized. In the preferred embodiment, a solenoid operated latch is provided for ensuring that the cover 78 of the original document handler is closed during operation. At this time, drive means 76 are energized for rotating the shaft 34, and the various synchronizing and clocking pulses are generated. The drum 28 is also rotated by the main machine drive.

At the generation of the first synchronizing pulse, the copying cycle begins. Typically, during warm-up, the carrier 32 rotates twice before the copying cycle is activated. However, after warm-up of the machine, many of the above steps are omitted and the timing sequence begins at the point indicated by the dotted line 130. Starting at line 130, it will be seen that the exposure lamp 25 is energized upon generation of the twenty-fourth clocking pulse during the first revolution (dotted line 130) of the carrier 32 as indicated by generation of a synchronizing pulse. The high voltage power supply is energized at the fourth pulse of the second revolution and copying begins. At the third pulse of the third revolution, a feed clutch is activated for the next seventeen pulses to feed copy paper from the platform 30 into transport means (not shown) for transporting the copy paper into engagement with the rotating drum and through the copying apparatus. The transport clutch for energizing the means to advance the copy paper through the copy apparatus is energized at approximately the tenth pulse of the third revolution and is de-energized at the twenty-ninth pulse of the third revolution, when the first copy is completed and a signal is generated for updating the counter in the microcomputer and for updating a readout at the control panel.

Thus, it can be seen that the exemplary embodiment produces one copy for each revolution of the original, the delivery of the finished copy lagging behind the rotation of the original by three revolutions (i.e., three seconds in the exemplary embodiment). The cycle will now repeat for as many revolutions as required to make a selected number of copies, as entered into the microcomputer. In the exemplary embodiment, the cycle is repeated to make two copies on the third and fourth revolutions after warm-up. The exposure lamp then shuts down on the twenty-fourth pulse of the revolution following the last copying revolution, the high voltage supply and pump shut down on the sixteenth pulse of the next revolution and after two additional revolutions, the main drive is deenergized on the thirty-first pulse and the rotation of the carrier stops, whereby the original document may be unloaded. While not specifically shown in the exemplary timing diagram, it may also be desirable to provide for various parity and malfunction checks during operation of the machine, in the manner well known to those who are skilled in the art.

It will be noted from the above that the synchronizing pulse generated by sensor 118 resets the clocking count for each revolution of the carrier 32. Thus, if a false clocking pulse is generated or lost due to external electrical noise or the like, the error is not compounded beyond a single revolution of the carrier and a single copying cycle.

An exemplary timing diagram for the bypass mode of operation is shown in FIG. 16. As there shown, the microcomputer is switched to the bypass mode by opening the bypass cover 80 and energizing a microswitch 132 which is mounted on frame 40 (see FIGS. 1 and 13). The switch 132 is automatically energized when the cover 80 is opened for generating an input signal via conductor 134 to the microcomputer 124. Receipt of this signal interrupts any in-process normal mode of operation without disturbing the copy count. Thus, when the bypass mode of operation is completed, the normal mode can be continued from the point of interruption.

When the bypass mode is activated by opening the cover 80, the normal mode is interrupted upon completion of a full revolution as indicated by the next synchronizing pulse. When an original document is inserted into the bypass means, its leading edge is guided into forward feed rollers 98, 99 by upper and lower guides 88, 90 and 100. A microswitch 136 mounted on frame 40 of the machine (see FIGS. 1 and 13), senses when the leading edge of the document has approximately reached rollers 98, 99 and generates a signal which is introduced into the microcomputer 124 via conductor 138 for initiating the bypass mode copying cycle.

At this time, a status check is performed and upon completion of the status check, the main machine drive is energized for causing rotation of the carrier 32 and the drum 28, as in the normal mode of operation. At this time the pump is also energized. After this, the operation of the machine is similar in sequence to the normal mode of operation, with the exposure lamp 25 being energized on the twenty-fourth pulse of the first revolution of carrier 32 (dotted line 142), and with the high voltage power supply being energized on the fourth pulse of the second revolution. At approximately the eighth pulse of the second revolution, and continuing until the twenty-seventh pulse, original feed clutch 140 is energized for driving forward feed rollers 98, 99 and advancing the document past window 22.

Since the document being advanced by rollers 98, 99 is not covered by the transparent cover 42 during the bypass mode of operation, it is not necessary to have as intense a light source for properly projecting the image from the document to the lens 24. Therefore, during the bypass mode, the microcomputer is programmed to shift the lamp output to a lower intensity.

The rearward feed rollers 104, 105 are rotated whenever the machine main drive is energized during the bypass mode, and by the twenty-seventh pulse of the second revolution, the leading edge of the original document has been advanced by rollers 98, 99 into engagement with rollers 104, 105. At this time, the clutch 140 may be de-energized to make rollers 98, 99 free wheeling. This is desirable as it minimizes the chances of damaging the original document due to a misfeed or other malfunction. As in the normal mode of operation, on the second pulse of the next revolution, a feed clutch (not shown) is activated to feed copy paper from platform 30 into transport means (not shown) for transporting the copy paper into engagement with the rotating drum and through the copying apparatus. The transport clutch for energizing the means for advancing the copy paper through the copy apparatus is energized at approximately the tenth pulse of the same revolution and de-energized at the twenty-ninth pulse, when the copy is completed.

On the twenty-fourth pulse of the next revolution, the original feed switch 136 is checked for the presence of another original document in the bypass means. If none is present, the machine stays in the bypass mode for two additional revolutions before starting shutdown or before resuming an interrupted normal mode of operation. Of course, once the cover 80 is closed, the normal mode is resumed or shutdown is started on the next revolution. Again, as in the normal mode of operation, it may be desirable to provide for various parity and malfunction checks during operation.

One advantage to use of the bypass mode is the flexibility permitting the copying of odd-sized original documents. For example, a large original would lengthen the time the feed switch 136 is energized and this would, in turn, cause a corresponding alteration of the various machine functions.

While certain embodiments and features have been described in detail herein, it will be understood that the present invention includes any alterations or modifications consistent with the spirit and scope of the appended claims.

What is claimed is:

1. In combination, apparatus having a document viewing station, document processing apparatus associated with the document viewing station, and document feeding means for advancing a document past the viewing station, the improvement comprising:
   (a) a carrier rotatably mounted adjacent said viewing station for advancing a document past the viewing station;
   (b) a transparent document holder carried by said carrier for releasably securing a document adjacent the periphery of said carrier, said document holder having one end non-releasably secured to said carrier and an opposite end releasably secured to said carrier;
   (c) control means including a timing means coupled to said carrier for producing timing signals in synchronized relationship with advancement of the document past said viewing station for controlling operation of the document processing apparatus including additional means for advancing a document past the viewing station, comprising:
   (d) means for receiving and advancing the document intermediately of the carrier and the viewing station, and
   (e) sensing means responsive to the presence of a document in said additional means and operable in combination with said control means to advance the document past the viewing station in synchronized relationship with the rotation of the carrier and the operation of said copying apparatus.

2. The apparatus of claim 1, including motive means responsive to the control means for rotating the carrier, said control means including a microcomputer programmed to respond to said timing signals to maintain energization of said motive means for a selected number of revolutions corresponding to advancement of a single document past the viewing station a selected number of times, the microcomputer including:
   (a) means for counting, and comparing with the selected number, the number of revolutions made by the carrier, and
   (b) means responsive to introduction of a document into said additional means for storing and holding the count representing the revolutions made by said carrier prior to the introduction of said document into said additional means and responsive to departure of said document from said additional means to resume counting the revolutions of said carrier.

3. The apparatus of claim 2, wherein the microcomputer initiates the operating cycle comprised of a predetermined number of steps to be completed during a single revolution of the carrier, said microcomputer including means for updating and restarting said cycle whenever the beginning of a revolution of the carrier is sensed.

4. The apparatus of claim 1, the processing apparatus including means operable in a first condition when the document advanced past the viewing station is carried by said carrier and operable in a second condition when the document is advanced past said viewing station by said additional means, said sensing means responsive to the presence of said document in said additional means for shifting said means from the first condition to the second condition.

5. The apparatus of claim 4, wherein said last mentioned means includes a lamp for illuminating the document as it is advanced past the viewing station, the lamp operable at a first intensity during said first condition and a second intensity during the second condition.

6. The apparatus of claim 1, the receiving and advancing means of said additional document advancing means including:
   (a) first feeding means for engaging the document when it has been manually inserted in said additional means for advancing the document past the viewing station, and
   (b) second feeding means for engaging the document after a leading edge thereof has advanced past the viewing station,
   (c) said control means responsive to a predetermined sequence of timing signals for disengaging drive to said first feeding means thereby leaving advance of the sheet to said second feeding means.

7. The apparatus of claim 6, including selectively energizable means for activating the first feeding means to advance the document engaged thereby in synchronized relationship with the rotation of the carrier, and means in said control means responsive to said timing signals for sensing the beginning of a revolution of the carrier to energize said activating means.

8. The apparatus of claim 6, the receiving means comprising a lower chute assembly movable between retracted and extended positions and adapted for receiving a document for advancement past the viewing station when in said extended position.

* * * * *